W. J. MILLARD.
AUTOMOBILE BUMPER.
APPLICATION FILED JUNE 12, 1919.
1,348,030.
Patented July 27, 1920.
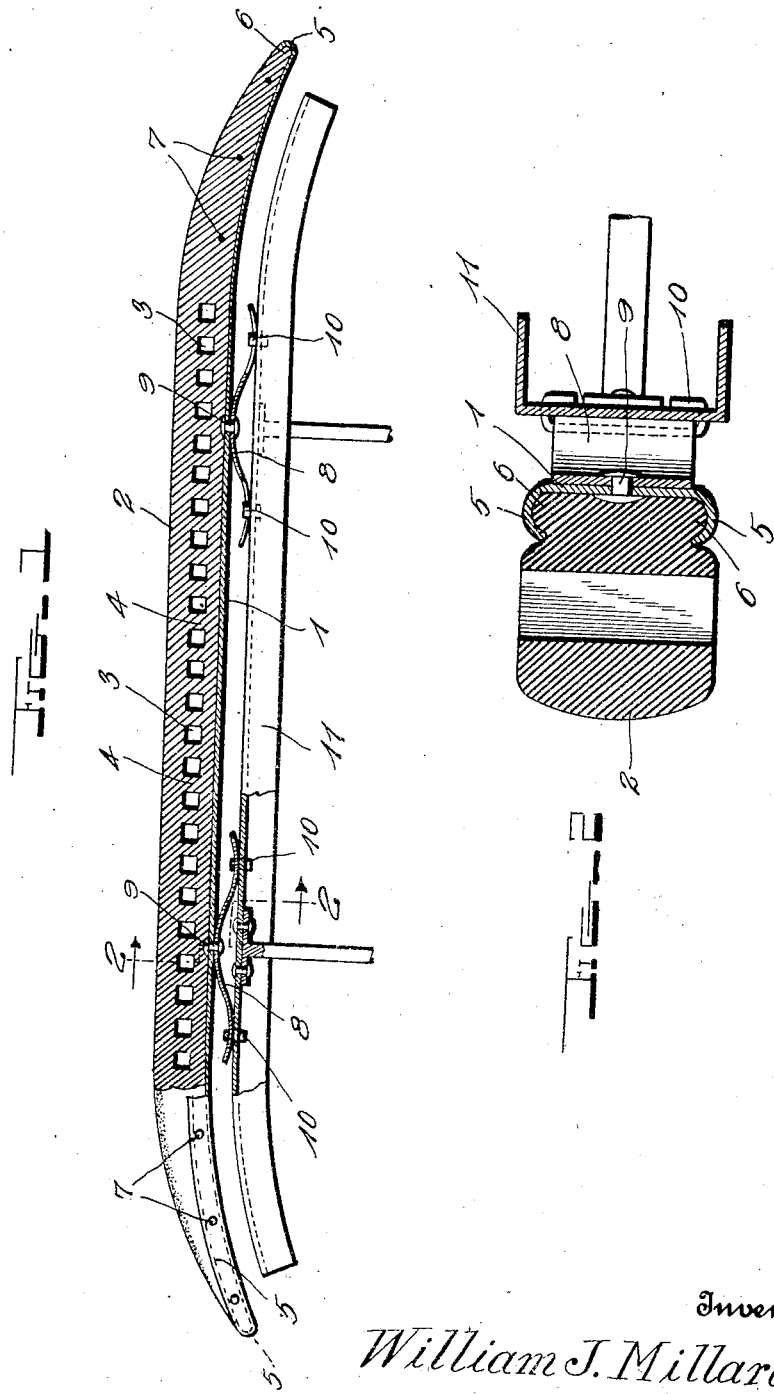
Inventor
William J. Millard
By H. R. Wilson & Co.
Attorneys

UNITED STATES PATENT OFFICE.

WILLIAM J. MILLARD, OF NEW YORK, N. Y.

AUTOMOBILE-BUMPER.

1,348,030.

Specification of Letters Patent.

Patented July 27, 1920.

Application filed June 12, 1919. Serial No. 303,554.

*To all whom it may concern:*

Be it known that I, WILLIAM J. MILLARD, a citizen of the United States, residing at New York, in the county of Bronx and State of New York, have invented certain new and useful Improvements in Automobile-Bumpers; and I do declare the following to be a full, clear, and exact description of the invention, such as will enable others skilled in the art to which it appertains to make and use the same.

My invention relates to improvements in bumpers for vehicles and more particularly to such devices as used on automobiles, and the principal object of my invention is to provide a comparatively simple and inexpensive, yet a highly efficient and reliable bumper having a cushion along its entire outer side and free of metal fittings throughout its outer face, to prevent possibility of injuring other vehicles which may be struck thereby.

A further object is to provide a bumper which may be readily installed upon the ordinary bumpers now in use and which will be reinforced thereby under heavy strains.

With the foregoing in view, the invention resides in the novel construction and arrangement of parts hereinafter fully described and claimed, the descriptive matter being supplemented by the accompanying drawing.

Figure 1 is a top plan view partly in horizontal section showing the construction and application of my invention.

Fig. 2 is a vertical section on the plane indicated by line 2—2 of Fig. 1.

In the drawing above briefly described, the numeral 1 designates a metal bar adapted to be attached by any preferred means to an automobile or other vehicle, the outer side of said bar being entirely covered by a cushioning bar 2 of rubber or any other preferred material possessing the necessary elasticity. The bar 2 is of solid formation and is provided with closely spaced openings 3 providing a multiplicity of resilient webs 4 connecting the outer and inner side portions of said bar. These openings and webs not only permit the bar to be compressed at right angles to its length, but allow it to yield longitudinally, thereby making provision for most effectively absorbing the shock, no matter at what angle the bumper may strike another machine or other object. If desired, the openings and webs may extend entirely to the ends of the bars 2, but in most instances I terminate them at points spaced inwardly from said ends and curve the latter inwardly, and taper them, the bar 1 being correspondingly curved.

For attaching the cushioning bar 2 to the metal bar 1, I prefer to equip the latter with clencher flanges 5 which may well extend throughout its length and across its ends, and I provide the bar 2 with beads 6 which are tightly held by the flanges 5. In addition to this securing means, bolts 7 may be passed through the flanges and the intervening portion of the bar 2.

The bar 1 may be mounted on the vehicle in any suitable manner, but I prefer to provide the inner side of said bar, that is the side positioned next to the vehicle, with semi-elliptic springs 8, the centers of said springs being secured to the bar by rivets or the like 9. The free ends of the springs are passed through guide clips 10 carried by an ordinary bumper 11. The resiliency of the bar 2 cushions most shocks, but when they are more severe, the springs 8 come into play, and when extreme inward strain is encountered, these springs straighten and allow the bar 1 to move rearwardly against the bar 11, thereby allowing the latter to serve as a reinforcement which will in most cases prevent bending of any parts.

The device is simple and comparatively inexpensive, yet is highly efficient and in every way desirable, serving not only to protect the machine equipped therewith against injury, but insuring that other machines which may be struck by the bumper, will not be marred or dented as often occurs with the bumpers now commonly used. Not only is the general construction of the device of advantage, but the use of a supplemental cushioned bumper spaced outwardly from a rigid bumper bar and connected thereto by springs, is a very desirable equipment for any car.

Since probably the best results may be obtained from the details disclosed, they may well be followed, but within the scope of the invention as claimed, numerous minor changes may well be made and obviously the bumper may be used either at the front or back of the machine or at both locations.

I claim:

1. A vehicle bumper comprising a metal bar adapted to be secured to the vehicle, and a bar of cushioning material secured against the outer side of said metal bar with its entire outer face free of metal, said cushioning bar being of solid formation except having closely spaced openings formed therethrough to provide freely yieldable webs connecting the outer and inner side portions of said bar.

2. A vehicle bumper comprising a metal bar adapted to be secured to the vehicle and having clencher flanges, and a bar of cushioning material bearing against the outer side of said metal bar and having beads held by said clencher flanges, said cushioning bar having closely spaced openings at the outer edges of said flanges forming yieldable webs connecting the inner and outer side portions of the bar.

In testimony whereof I have hereunto set my hand.

WILLIAM J. MILLARD.